US009038914B2

(12) United States Patent
Smets et al.

(10) Patent No.: US 9,038,914 B2
(45) Date of Patent: May 26, 2015

(54) METHOD AND SYSTEM FOR SIMULATING A PROXIMITY-BASED TRANSACTION DEVICE

(75) Inventors: Patrik Smets, Nijlen (BE); Eddy Lodewijk Hortensia Van De Velde, Leuven (BE); Duncan Garrett, London (GB); David Anthony Roberts, Warrington (GB)

(73) Assignee: MasterCard International Corporation, Purchase, NY (US)

( * ) Notice: Subject to any disclaimer, the term of this patent is extended or adjusted under 35 U.S.C. 154(b) by 1034 days.

(21) Appl. No.: 12/668,184

(22) PCT Filed: Jul. 7, 2008

(86) PCT No.: PCT/US2008/069337
§ 371 (c)(1),
(2), (4) Date: Nov. 5, 2010

(87) PCT Pub. No.: WO2009/006633
PCT Pub. Date: Jan. 8, 2009

(65) Prior Publication Data
US 2011/0042465 A1 Feb. 24, 2011

Related U.S. Application Data

(60) Provisional application No. 60/948,093, filed on Jul. 5, 2007, provisional application No. 60/948,087, filed on Jul. 5, 2007, provisional application No. 60/948,099, filed on Jul. 5, 2007.

(51) Int. Cl.
*G06K 19/00* (2006.01)
*G06K 19/06* (2006.01)
(Continued)

(52) U.S. Cl.
CPC ............ *G06K 7/0008* (2013.01); *G06K 7/0095* (2013.01); *G06K 7/10465* (2013.01)

(58) Field of Classification Search
CPC . G06K 7/008; G06K 7/0095; G06K 7/10465; G06Q 20/341
USPC ......... 235/487, 492, 493, 375, 376, 380, 382, 235/449, 451
See application file for complete search history.

(56) References Cited

U.S. PATENT DOCUMENTS 4,053,844 A * 10/1977 Hamaoui ........................ 330/2
4,910,659 A * 3/1990 Gates et al. .................... 700/21
(Continued)

OTHER PUBLICATIONS
International Search Report for PCT/US08/069337, Sep. 18, 2008.
(Continued)

*Primary Examiner* — Daniel Walsh
(74) *Attorney, Agent, or Firm* — Baker Botts L.L.P.

(57) ABSTRACT

Reference equipment including a reference card and a reference reader is provided for testing electronic payment devices such as cards and card readers. The reference equipment includes reference cards and reference readers that respectively can be used to verify compliance of product cards and product readers with product specifications The product specifications may, for example, be the ISO 14443 Standard specifications which are commonly accepted in the electronic payment industry The reference equipment is designed to enhance interoperability of product payment devices whose functional behaviors may vary because of vendor customization of device specifications or due to manufacturing tolerances In some embodiments, the reference equipment includes a reference card for testing card readers The exemplary reference card can comprise a current mirror to permit an electronically adjustable variable load using an external controller The reference card electronic circuit can exhibit variable load conditions.

15 Claims, 12 Drawing Sheets

(51) Int. Cl.
*G06K 7/08* (2006.01)
*G06K 5/00* (2006.01)
*G06K 7/00* (2006.01)
*G06K 17/00* (2006.01)
*G06K 7/10* (2006.01)

(56) References Cited

U.S. PATENT DOCUMENTS

| | | | |
|---|---|---|---|
| 5,016,212 A * | 5/1991 | Yamaguchi et al. | 711/115 |
| 6,253,163 B1 * | 6/2001 | Lapie | 702/183 |
| 6,536,673 B1 * | 3/2003 | Kawasaki et al. | 235/492 |
| 7,072,781 B1 | 7/2006 | Gershon et al. | |
| 7,239,973 B2 * | 7/2007 | Schahl et al. | 702/122 |
| 7,431,217 B2 * | 10/2008 | Smets et al. | 235/492 |
| 7,765,080 B2 | 7/2010 | Ludwig et al. | 702/122 |
| 7,775,445 B2 * | 8/2010 | Smets et al. | 235/492 |
| 2003/0179028 A1 * | 9/2003 | Kizer et al. | 327/158 |
| 2004/0008010 A1 * | 1/2004 | Ebrahim et al. | 322/44 |
| 2004/0008018 A1 * | 1/2004 | Miller et al. | 324/67 |
| 2004/0099737 A1 * | 5/2004 | Saeki | 235/437 |
| 2005/0185460 A1 * | 8/2005 | Roesner et al. | 365/185.02 |
| 2005/0280745 A1 | 12/2005 | Jaffe | |
| 2006/0022044 A1 * | 2/2006 | Smets et al. | 235/451 |
| 2006/0022045 A1 * | 2/2006 | Smets et al. | 235/451 |
| 2006/0027655 A1 * | 2/2006 | Smets et al. | 235/451 |
| 2006/0276989 A1 * | 12/2006 | Ludwig et al. | 702/122 |
| 2008/0165951 A1 * | 7/2008 | Somers et al. | 380/2 |
| 2008/0191031 A1 * | 8/2008 | Smets et al. | 235/492 |
| 2009/0303885 A1 * | 12/2009 | Longo | 370/242 |
| 2010/0318315 A1 * | 12/2010 | Smets et al. | 702/122 |
| 2011/0042465 A1 * | 2/2011 | Smets et al. | 235/492 |
| 2014/0263643 A1 * | 9/2014 | Kim et al. | 235/439 |
| 2014/0319228 A1 * | 10/2014 | Saas et al. | 235/492 |

OTHER PUBLICATIONS

U.S. Appl. No. 12/668,179, filed Sep. 1, 2010.
International Search Report for PCT/US08/069342, dated Oct. 3, 2008.
U.S. Appl. No. 12/668,179, Apr. 11, 2013 Amendment after Allowance and Issue Fee payment.
U.S. Appl. No. 12/668,179, Jan. 11, 2013 Notice of Allowance.
U.S. Appl. No. 12/668,179, Dec. 17, 2012 Response to Non-Final Office Action.
U.S. Appl. No. 12/668,179, Aug. 16, 2012 Non-Final Office Action.

* cited by examiner

PayPass - Ref. Equipment

FIG. 1B1
Reader Testing
1. Calibrate PayPass Reference PICC for measuring
   - power transmission
   - data transmission PCD ⟶ PICC
using PayPass Ref. PCD
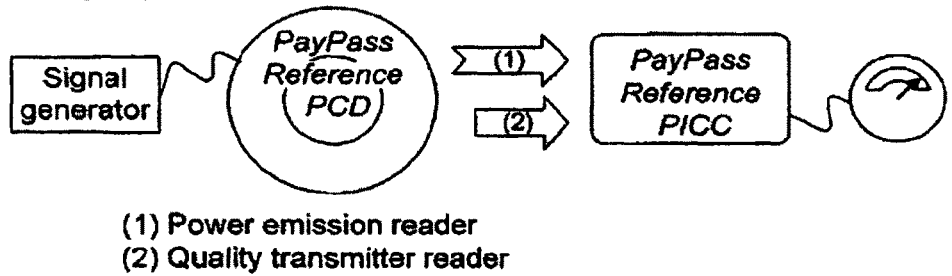
(1) Power emission reader
(2) Quality transmitter reader
2. Put reader under test in place.
Analyze reader power parameters by means of PayPass Reference PICC:
- Reader power parameters (1)
- Reader transmitter parameters (2)
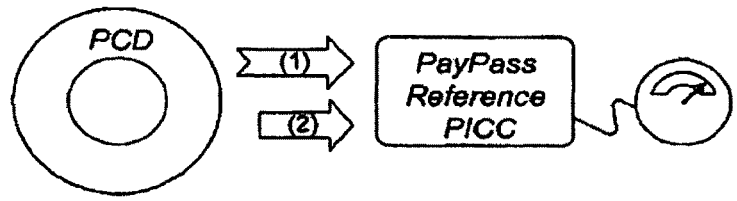

FIG. 1B2
3. Calibrate PayPass Reference PICC for
   • data transmission PICC ⟶ PCD
   using PayPass Ref. PCD
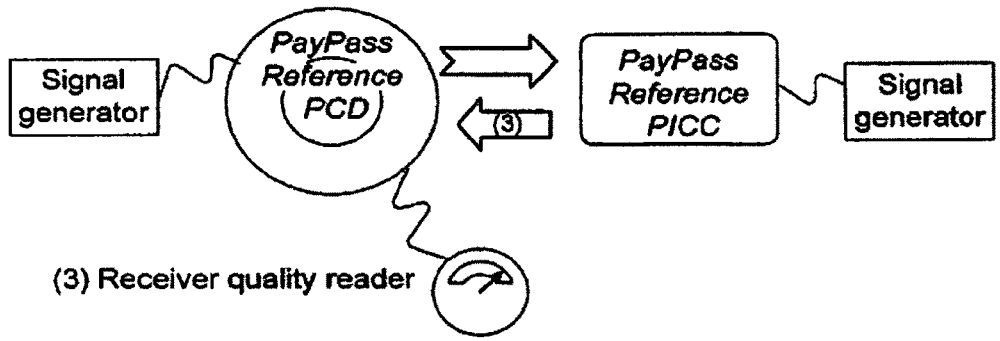
(3) Receiver quality reader
4. Put reader under test in place.
If response of PayPass Ref. PICC is followed by reader command:
- Reader receiver parameters OK (3)
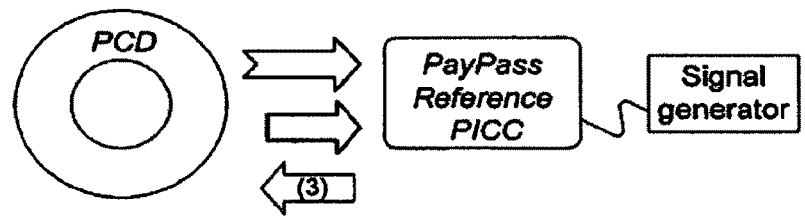

FIG. 1B3
Card Testing
1. Calibrate PayPass Reference PCD for
   • power transmission
   • data transmission PCD ⟶ PICC
   using PayPass Ref. PICC
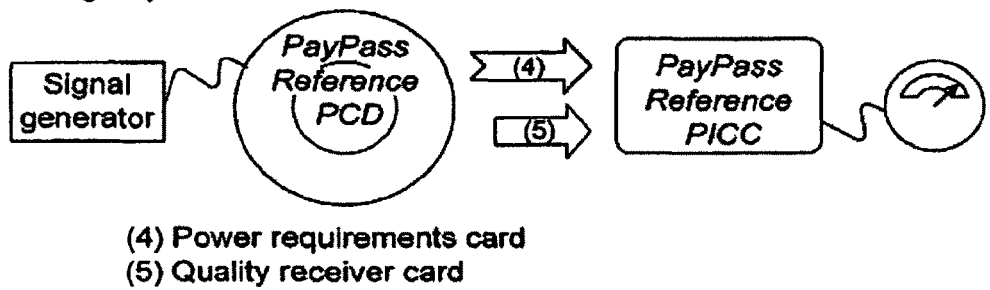
(4) Power requirements card
(5) Quality receiver card
2. Put card under test in place.
If card responds to reader command:
- Card power requirements OK (4)
- Card receiver requirements OK (5)
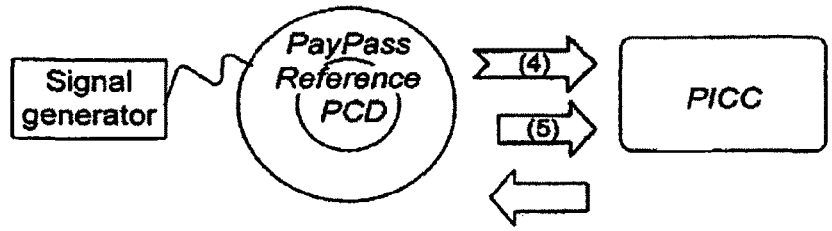

FIG. 1B4
3. Calibrate PayPass Reference PCD for
   • data transmission PICC ⟶ PCD
using PayPass Ref. PICC
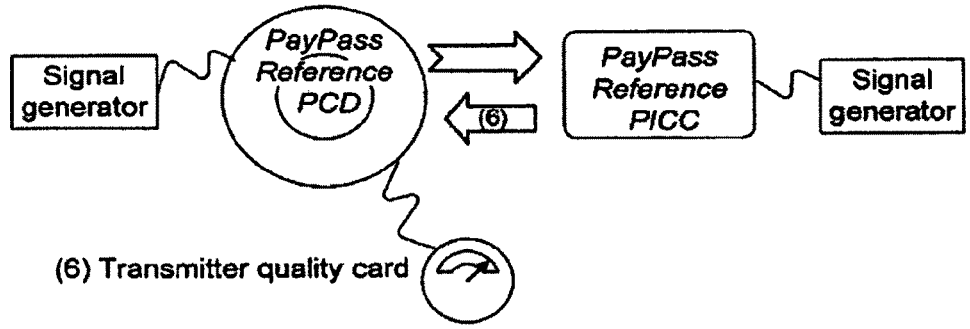
(6) Transmitter quality card
4. Run on real card and analyze response.
If card response OK:
- Card transmitter requirements OK (6)
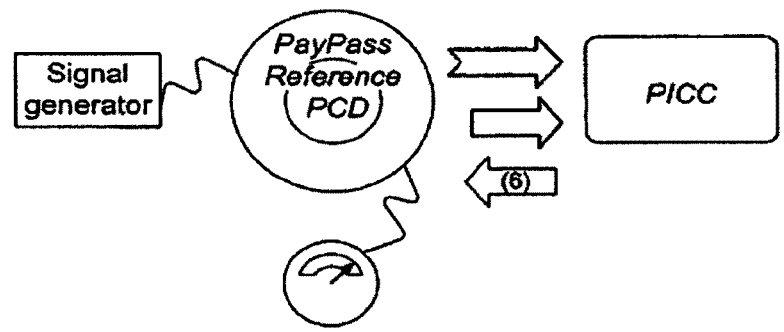

*PayPass* – Reference PCD antenna

*PayPass* – Reference PICC

The Reference CMR Circuit

Antenna Circuit Diagram

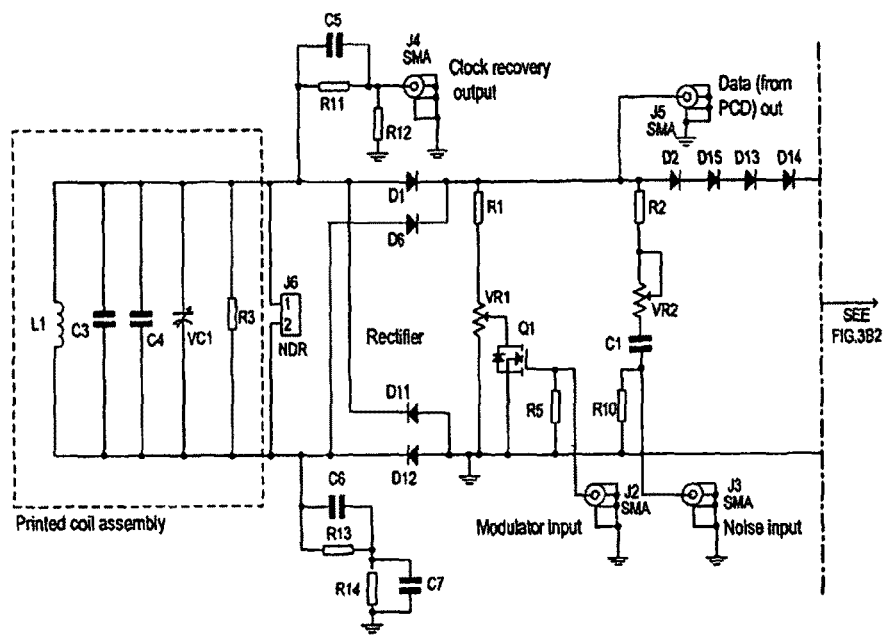
FIG. 3B1

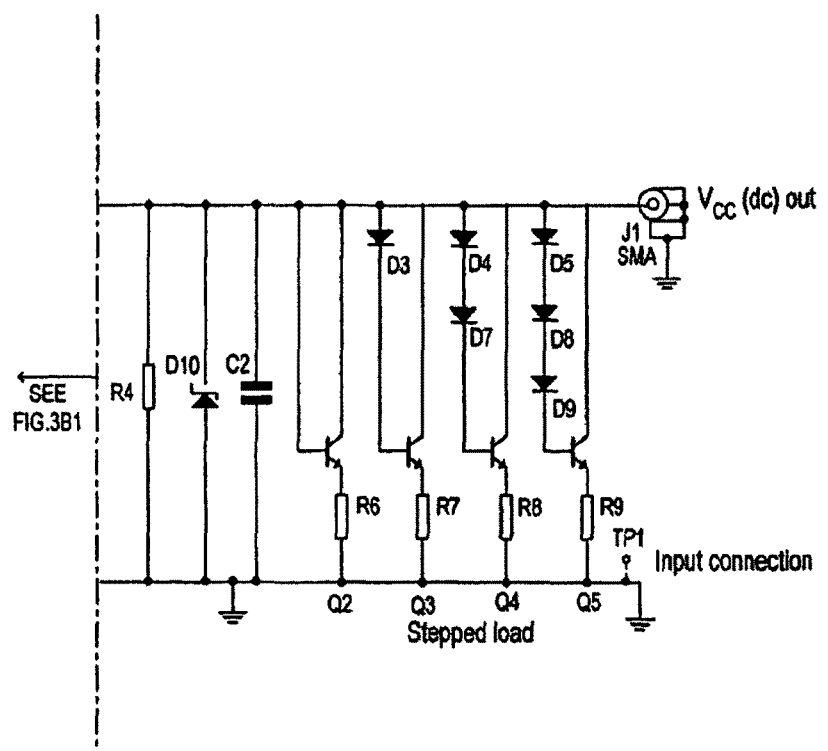
FIG. 3B2

The Reference PICC

Reference PICC Circuit Diagram

METHOD AND SYSTEM FOR SIMULATING A PROXIMITY-BASED TRANSACTION DEVICE

CROSS-REFERENCE TO RELATED APPLICATIONS

This application is a 35 U.S.C. 371 National Phase of International Application PCT/US08/069,337, filed Jul. 7, 2008, published Jan. 8, 2009, which claims the benefit of U.S. provisional patent applications No. 60/948,099 filed on Jul. 5, 2007, 60/948,087 filed on Jul. 5, 2007, and 60/948,093 filed on Jul. 5, 2007. All of the aforementioned patent applications are hereby incorporated by reference herein in their entireties.

BACKGROUND OF THE INVENTION

Radio Frequency Identification (RFID) tags are small integrated circuits (ICs) connected to an antenna, which can respond to an interrogating RF signal with simple identifying information, or with more complex signals depending on the size of the IC. This technology does not require contact or line of sight for communication. Radio Frequency Identification (RFID) technology is now economically viable and is deployed in more and more commercial and industrial applications. For example, RFID technology is now widely used for tags on items in warehouses, shops, ID or access cards, etc. In addition, a type of RFID technology has been introduced in the payment card industry (e.g., by MasterCard, American Express and Visa) in the form of "contactless" payment or credit cards embedded with RF or contactless circuitry. These contactless payment cards can be used to make electronic payment transactions via radio communication with an RF-enabled payment terminal. The contactless payment cards can provide consumers with simple, fast and convenient ways to pay for goods and services, for example, in retail establishments, stores or supermarkets.

Several RF technologies are available for use in contactless payment cards and card readers/terminals. The basic components of a contactless system are the contactless reader (or Proximity Coupling Device (PCD)) and a transponder (or Proximity Integrated Circuit Card (PICC)). The contactless reader is an antenna connected to an electronic circuit. A transponder consists of an inductive antenna and an integrated circuit connected to the ends of this antenna. The combination reader-transponder behaves as a transformer. An alternating current passes through a primary coil (reader antenna) that creates an electromagnetic field, which induces a current in the secondary coil (transponder antenna). The transponder converts the electromagnetic field (or RF field) transmitted by the contactless reader (PCD) into a DC voltage by means of a diode rectifier. This DC voltage powers up the transponder's internal circuits. The configuration and tuning of both antennas determines the coupling efficiency from one device to the other. The transponders may be the contactless payment cards (or payment devices, when not in card form).

For contactless payment card systems to be economically viable and to gain commercial acceptance, the contactless payment cards must be interoperable at all or most RF-enabled payment terminals, even when the cards and terminals have technological features that are proprietary to specific card providers/issuers, vendors or terminal manufacturers. Industry-wide interoperability is desirable. Towards this end, industry standards organizations and groups (e.g., International Organization for Standards (ISO) and International Electro Technical Committee (IEC)) have formulated voluntary industry standards for implementation of contactless payment technologies. Three such exemplary standards which have been defined by ISO/IEC are the ISO/IEC 10536, ISO/IEC 14443, and ISO/IEC 15693 standards applicable to Close Coupling, Proximity and Vicinity cards, respectively.

The ISO/IEC 14443 proximity card standards (ISO 14443) have been used for several contactless card deployments worldwide. The targeted range of operations for ISO 14443 proximity cards is up to 10 cms, although this range varies depending on business needs, antenna geometries, power requirements, memory size, CPU, and co-processor.

The ISO 14443 standards document has four distinct parts.

Part 1: Physical Characteristics, defines the physical dimensions for a Proximity Integrated Circuit Card (PICC). The card is the ID-1 size (85.6 mm×54.0 mm×0.76 mm). This is the same size as a traditional payment card.

Part 2: Radio Frequency Power and Signal Interface, defines key technical characteristics of the contactless IC chips, including items such as frequency, data rate, modulation, and bit coding procedures. Two variations are detailed in Part 2, the Type A interface and the Type B interface. Both operate at the same frequency and use the same data rate, but they differ from one another in the areas of modulation and bit coding.

Part 3: Initialization and Anticollision. Initialization describes the requirements for proximity coupling device (PCD) (i.e., the reader) and the card to establish communication when the card is brought into the reader's radio frequency (RF) field. Anticollision defines what happens when multiple cards enter the magnetic field at the same time, identifying how the system determines which card to use in the transaction and ensuring that all cards presented are inventoried and processed.

Part 4: Transmission Protocols, defines the data format and data elements that enable communication during a transaction.

For a system of contactless payment cards and card readers to be compliant with ISO 14443, they must meet the requirements of at least some of parts of the voluntary standard. In addition to contactless technologies that are standardized under ISO 14443, a number of proprietary contactless interfaces are also used in the industry (e.g., Cubic's GO-Card and Sony's FeliCa card). With existing card technology deployments, interoperability can be an issue. Card readers deployed by vendors in the marketplace should preferably accommodate several different card types. For example, a desirable card reader would support ISO 14443 Type A and Type B cards, ISO 15693 cards and any additional proprietary card types.

Interoperability issues can arise even with card deployments that are presumably compliant with a single ISO standard (e.g., ISO 14443). In the ISO 14443 standard, all requirements or specifications related to RF Power and signal interfaces in the contactless card and reader system (i.e., the physical layer in an Open System Interconnection (OSI) model view of the system) are defined using separate standardized tests for cards and for readers. The ISO/IEC 10373 Standard Part 6 (ISO 10373-6) deals with test methods, which are specific to contactless integrated circuit card technology (proximity card). Compliance of contactless cards and readers to ISO 14443 is verified using reference devices. According to ISO 10373-6, a set of "reference" cards (i.e., Reference PICC), which represent the characteristics of contactless cards, is used for measuring specification compliance of a contactless reader. (See, e.g., FIG. 1a). For example, the Reference PICC is used to test the magnetic field produced or transmitted by a PCD, and to the test the ability of the PCD to power a PICC. Similarly, a "reference" reader (i.e., a Test or Reference PCD), which may represent the characteristics of a typical contactless reader, is used for measuring specification compliance of contactless cards. For example, the Reference PCD is used to test the load modulation that is generated by cards during testing.

FIG. 1b shows the functional tests conducted on a product reader under ISO 10373-6 for testing the power and data links between cards and readers.

While the separate card and reader compliance test procedures under ISO 10373-6 may ensure that deployed product devices individually have characteristics that fall in either the designated specification range for cards or readers, the procedures do not ensure interoperability in the field. Cards and/or readers verified as compliant may be only marginally so (e.g., by having a characteristic value at the end or edge of a designated specification range). This manner of standards compliance can lead to operational failure in the field. For example, a marginally compliant card may be unreadable or difficult to read using a card reader that is also only marginally compliant.

Consideration is now being given to ways of enhancing interoperability of electronic payment devices that are used in contactless electronic payment systems. Attention is directed to reducing variations in card and reader properties consistent with commonly accepted standards. In particular, attention is directed to improving standard compliance procedures to enhance interoperability of payment devices.

SUMMARY OF THE INVENTION

The present invention provides reference equipment for testing payment devices that may be deployed in the field for conducting electronic payment transactions. The reference equipment includes reference cards and reference readers that respectively can be used to verify compliance of product cards and product readers with product specifications. The product specifications may, for example, be the ISO 14443 Standard specifications which are commonly accepted in the electronic payment industry.

The reference equipment is designed to enhance interoperability of product payment devices whose functional behaviors may vary because of vendor customization of device specifications or due to manufacturing tolerances or differences in design approaches. In some embodiments, the reference equipment includes a reference card for testing card readers. The exemplary reference card can comprise a current mirror to permit an electronically adjustable variable load using an external controller. The reference card electronic circuit can exhibit variable load conditions that simulate field use of the several different types of payment cards in the electronic payment system to the card reader under test.

In some embodiments, the exemplary reference card electronic circuit can comprise an antenna having a resonant frequency tuned to any one of 13.56 MHz, 16.1 MHz, and 18 MHz.

Furthermore, in some embodiments, the exemplary reference card can be used to allow the variable load to represent maximum card power consumption in a worst case scenario to the card reader under test. Additionally, in some embodiments, the load provided by the exemplary reference card can be non-linear load. Also, the load can be adjusted internally or controlled by external load controller.

The reference devices may be used to establish acceptable compliance with specifications for issued cards and deployed readers using, for example, the methods disclosed in allowed, related U.S. patent application Ser. No. 11/182,354. In the disclosed methods, the reference card and reference reader are cross-calibrated to link the operational specifications for the cards and the readers. A suitable selection of overlapping specification ranges or tolerances for proper card and reader functions, enhances the interoperability of the issued cards with a deployed reader, and conversely, the interoperability of deployed readers with an issued card.

Further features of the invention, its nature and various advantages will be more apparent from the accompanying drawings and the following detailed description.

BRIEF DESCRIPTION OF THE DRAWINGS

FIGS. 1B1-1B4 is a schematic illustration of the several functional tests of power and data links between contactless readers and contactless proximity cards, in accordance with the principles of the present invention.

FIG. 3B is a circuit diagram of the PayPass-Reference card of FIG. 2b in accordance with the principles of the present invention.

FIG. 4 is a picture of an alternative exemplary Reference card (PICC) designed in accordance with the principles of the present invention.

DETAILED DESCRIPTION OF THE INVENTION

Figure 1A:
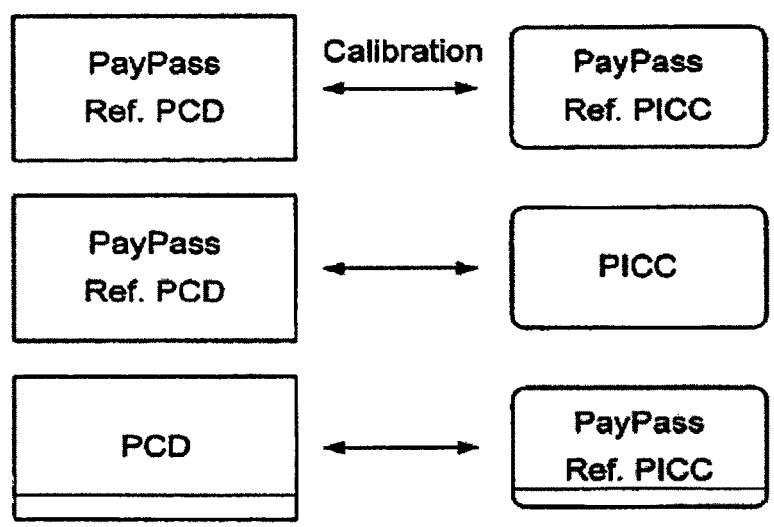
FIG. 1a is a block diagram, which schematically illustrates the step of cross-calibrating a Reference PICC with a Reference PCD in accordance with the principles of the present invention. The cross-calibrated Reference PICC and PCD devices are then used for testing the functional properties and specifications of a product contactless payment card and reader, respectively.

The present invention provides reference equipment for testing product payment devices that are deployed or used in the field for conducting electronic payment transactions. The reference equipment includes reference cards and reference card readers that respectively can be used to verify compliance of product cards and product readers with standard industry product specifications. The reference card and reader devices are designed so that their externally observable behavior is specified. The externally observable behavior is selected to replicate or simulate a nominal range of observed or expected behaviors of product devices deployed in the field. Using these reference devices to test product payment devices promotes interoperability of devices whose functional behaviors may vary due to vendor customization or due to manufacturing tolerances.

The inventive reference equipment is described herein in the context of implementations of electronic payment systems in which the contactless payment device specifications are intended to conform to a common industry standard such as the ISO 14443 Standard, which further specifies standardized test methods (i.e., ISO 10373-6 Test Methods, Proximity Cards) for verification of the specification of individual contactless payment devices. Recently, assignee MasterCard International Incorporated ("MasterCard") has developed proprietary specifications MasterCard PayPass™ ISO/IEC 14443 Implementation Specification ("PayPass") for implementation of proximity payment card technologies (e.g., by issuers, vendors or manufacturers of cards and card readers). The PayPass implementation is consistent with the ISO 14443 Standard and provides a convenient example illustrating the principles of the present invention. It will be understood that the selection of the PayPass implementation for purposes of illustration herein is only exemplary, and that the principles of the present invention can be more generally applied to electronic payment devices and systems that operate under other common industry or proprietary standards.

The PayPass implementation specifications, which may be utilized by different issuers, vendors or manufacturers of contactless cards and/or card readers, provide standard specifications for implementations of contactless payment device technologies. Specific communication protocols requirements are imposed on contactless payment devices, i.e., on cards (PICCs) and readers (PCDs). The PayPass specifications describe, for example, the electrical characteristics of the contactless interface between a PICC and PCD, and the data transfer characteristics of the communications between a PCD and a PICC including the high-level data transmission protocol, detailed signaling, modulation and bit coding schemes, and data formats used in such communications. The PayPass specifications also specify PCD processes and commands available for device functions such as initialization, polling, collision detection, and PICC activation and deactivation, and the state machine of the PICC in such processing functions. The PayPass specifications, therefore, although compatible with ISO 14443, refine these specifications to improve interoperability by restricting options and specifying parameters in a manner consistent with the Reference PICC and PCD.

The inventive reference equipment may be used in conjunction with the systems and methods disclosed in allowed U.S. patent application Ser. No. 11/182,357 for enhancing the interoperability of contactless payment devices (i.e., product cards issued to consumers and product readers deployed by merchants). The disclosed systems and methods ensure that individual product cards and readers operate or function in tighter specification ranges than they are permitted to operate in under the ISO 14443 standard. The systems and methods involve cross-calibrating the reference devices (i.e., the Reference PICC and Reference PCD devices), which are used to test specification compliance of individual product readers and cards under the ISO 14443 and ISO 10373-6 standards. The Reference PCD is used to establish a range of observed functional behaviors or parameters ("nominal card range") of the Reference PICC. Product card readers are required to have functional behaviors or parameters that are within this nominal card range as measured by the Reference PCD. Conversely, a Reference PICC is used to establish a range of observed functional behaviors or parameters ("nominal reader range") of Reference PCDs. Product readers are required to have functional behaviors or parameters that are within the nominal reader range when reading the reference card.

FIG. 1b schematically shows the functional tests conducted on payment devices in the PayPass implementations using cross-calibrated Reference PICC and Reference PCD devices.

The cross-calibration of the Reference PICC and Reference PCD establishes a relation between the two standard devices, and links the specifications for individual product cards with the specifications for product readers. This avoids interoperability failures that are possible with conventional unconnected or separate testing of card and reader specifications, for example, with the cards and readers that lie at the extreme edges of their respective specification ranges that are allowed under the ISO 14443 standard.

Exemplary procedures for ensuring or enhancing power, data transfer, and other functional interoperability of product contactless payment devices, which are based on cross-calibrated Reference PICC and PCD devices may involve the following steps:

(a) measuring the power provided by a PCD on a Reference PICC, (b) measuring data transmission (e.g., modulation depth, or other signal parameters) on the Reference PICC, (c) testing data reception (e.g., load modulation sensitivity) by a PCD by generating different signals through the Reference PICC. The PayPass-Reference PICC is first calibrated with respect to the Reference PCD to determine the levels and characteristics of the different signals generated by the Reference PICC, (d) measuring the data transmission by a PICC on the Reference PCD, with the Reference PCD parameters set to "average", and the Reference PCD sending value commands to the PICC and with the Reference PCD providing an "average" power level. Both the power level and the command characteristics produced by the Reference PCD are calibrated with respect to the Reference PICC, and (e) checking the data reception and power sensitivity of a PICC using the Reference PCD, with the Reference PCD sending commands with modulation characteristics and power levels at the border of the tolerance interval or range. Again, for setting these extreme values, the Reference PCD is calibrated with respect to the reference PICC.

Figure 2A:
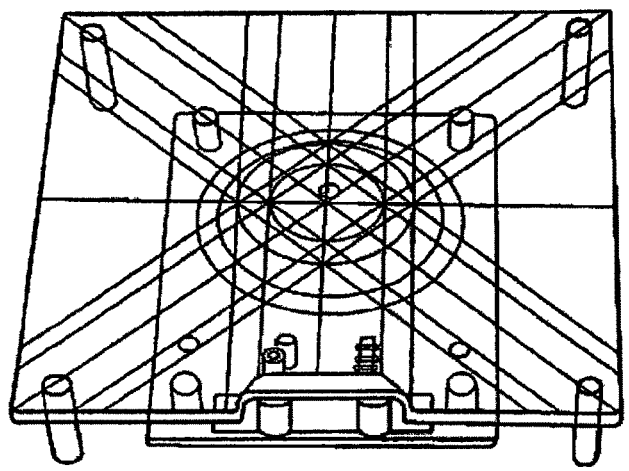
FIG. 2A is a picture of an exemplary PayPass-Reference reader designed in accordance with the principles of the present invention.
Figure 2B:
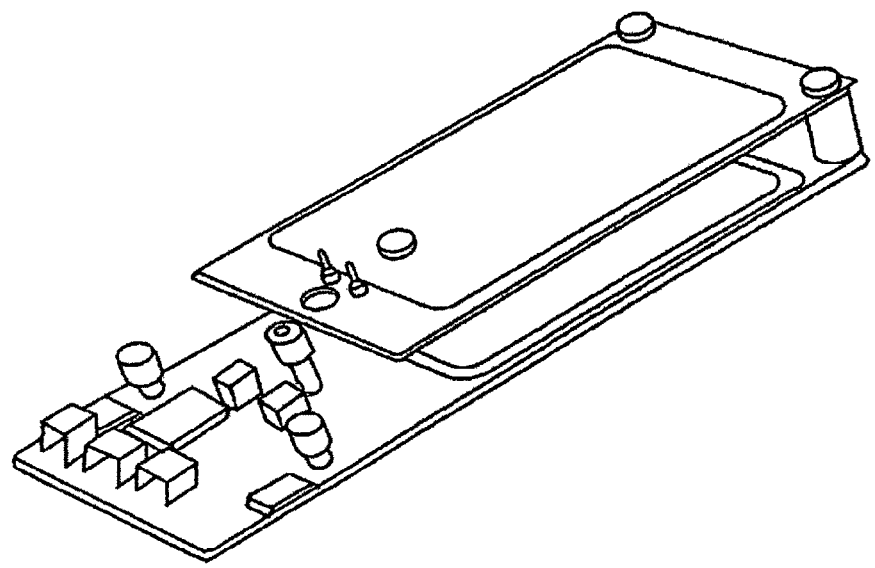
FIG. 2B is a picture of an exemplary PayPass-Reference card designed in accordance with the principles of the present invention.

In accordance with the present invention, exemplary card and reader reference devices are designed so that their externally observable behavior is specified. The externally observable behavior of reference devices may be selected to replicate or simulate a nominal range of observed or expected behaviors of product devices deployed in the field. Such reference devices (e.g., FIGS. 2a and 2b, PayPass-Reference PCD and PayPass-Reference PICC devices) are utilized in the PayPass implementation. FIGS. 2a and 2b respectively show photographs of physical PayPass-Reference PCD and PayPass-Reference PICC devices that are designed according to the PayPass implementation specifications.

The exemplary PayPass-Reference PCD and PayPass-Reference PICC are representative of existing deployments of contactless payment technologies. These reference devices are designed for operation with any counterpart product devices, which have functional characteristics that lie within a common industry specification range (e.g., a range allowed by the ISO 14443 standard, or observed in the field). The designs require that the reference devices can operate with all counterpart product devices including product devices whose functional characteristics may lie at the extremes of allowed or observed specification ranges. This design requirement promotes interoperability by permitting testing of all contactless PayPass or PayPass-like product devices. Any issued product card or PICC can be tested against the PayPass-Reference PICC and similarly any deployed product card reader or PCD can be checked against the PayPass-Reference PCD using, for example, the methods described in allowed related application Ser. No. 11/182,354.

Figure 2C:
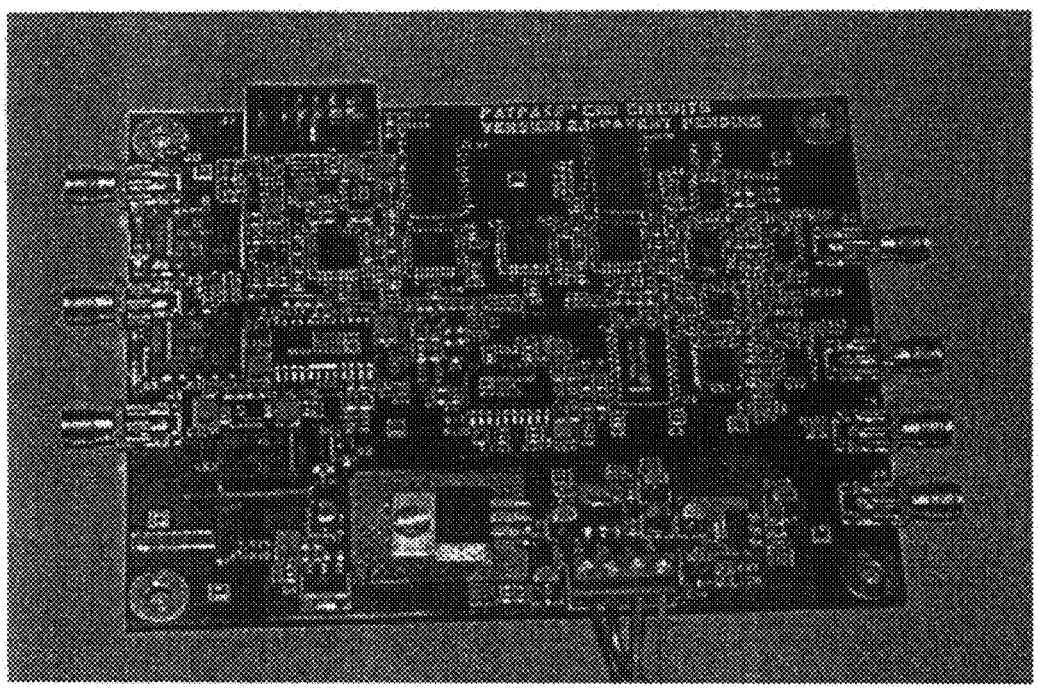
FIG. 2C is a picture of an exemplary Reference CMR Circuit designed in accordance with the principles of the present invention.

The exemplary PayPass-Reference PCD includes a circular antenna and a Common Mode Rejection (CMR) circuit. (See, e.g., FIGS. 2A-C).

Figure 3A:
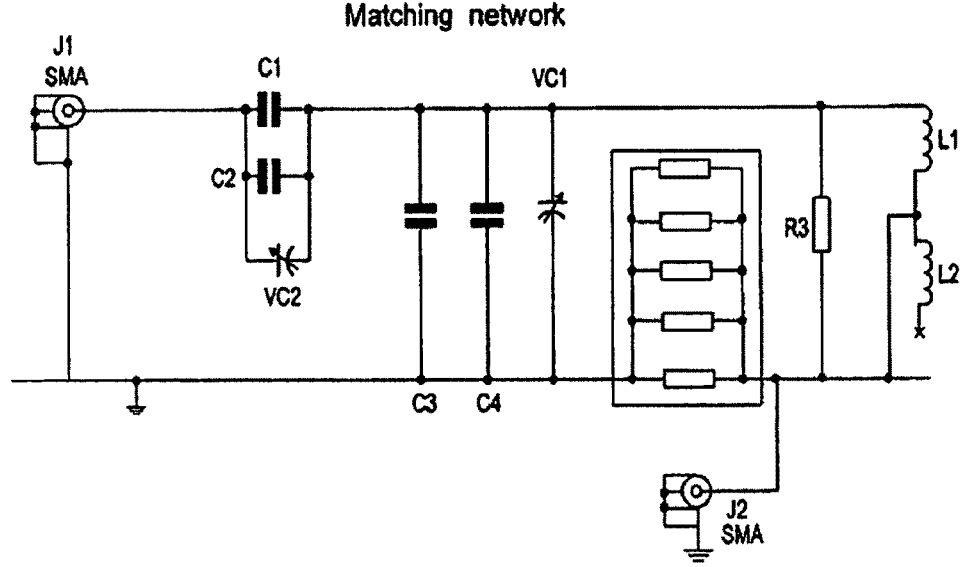
FIG. 3A is a circuit diagram of an antenna used in the PayPass-Reference reader of FIG. 2a in accordance with the principles of the present invention.

The antenna, which may be fabricated as a printed coil assembly, has a dual active and dummy windings. The dual windings reduce electric field sensitivity of the antenna. FIG. 3a shows a circuit diagram of the antenna, which, in addition to the dual winding coil, includes a tuning circuit, a matching network and suitable cable connectors (e.g., SMA connectors). The antenna coil, which is designed to resonate at 13.56 MHz, is fitted with a landing zone or plate on which cards may be placed for testing. In the exemplary PayPass-Reference PCD, the landing zone is specified to be at a fixed distance of about 15 cms from the antenna. The coil may also include an additional resistance in series with the antenna coil to enable the Q factor to be adjusted to cater for batch to batch variations. The PayPass-Reference PCD allows sending commands to PICCs when connected to a signal generator. The response from a PayPass PICC can be analyzed using the CMR circuit.

Table 1 shows a selected set of antenna design parameter values for the exemplary PayPass-Reference PCD.

TABLE 1

| Input impedance: | 50 ohms at 13.56 MHz |
| --- | --- |
| Coil diameter: | 7 cms |
| Physical location: | mounted 15 mm below landing zone plate |
| Overall board dimensions: | 4724 mils × 3543 mils |
| Coil inductance in free air, with no mutual coupling: | <1 micro Henry |
| Number of turns: | two, excluding compensation coil |
| Shape: | two concentric circles, connected in series |
| Track width: | 1 mm |
| Turn spacing: | 0.5 mm |
| Q factor: | 30 to 35 |
| Resonant frequency: | 13.56 MHz ± 7 KHz |

The antenna characteristics are selected to be representative of product reader characteristics observed in the field. For example, PayPass product terminals or readers deployed in the field have been empirically noted to have antenna diameters ranging from about 4 cms to about 10 cms, which corresponds to an average diameter of about 7 cms. Accordingly, the PayPass-Reference PCD antenna diameter is selected to be about 7 cms as representative of readers deployed in the field. Other PayPass-Reference PCD design parameters (e.g., electromagnetic, circuit and physical parameters) also may be similarly selected to make the device representative of readers deployed in the field.

In operation, a signal of about 600 mW may be fed into the antenna's 50Ω input impedance to generate a magnetic field, which is representative for most PayPass PCDs deployed in the field. The circular antenna creates a symmetric field distribution about the z-axis, which can simplify measurements.

Further in operation, a 13.56 MHz signal drives the reader coil via the matching network producing high voltages across the coil winding. The 13.56 MHz RF carrier emitted by the antenna can be amplitude modulated. The antenna hardware (e.g., CMR circuits) may allow recovery of the two carrier sidebands at 12.7 MHZ and 14.4 MHZ generated by the load modulation presented by a card or PICC under test. The recovered signal is fed into the CMR circuit to subtract the 13.56 MHz carrier signal and to recover an 847.5 KHz sub-carrier signal. The CMR circuit may have any convenient or suitable design. A suitable CMR circuit and its operation are described in allowed related U.S. patent application Ser. No. 11/182,358 and co-filed on Jul. 7, 2008 U.S. patent application named "Method And System For Detecting a Signal Generated By a Proximity-Based Transaction Device".

The PayPass-Reference PCD antenna has a high Q factor (~30-35). The high Q factor causes a significant circuit "ringing" when the carrier is switched off ("pause"). This "ringing" represents the worst case scenario for modulation (i.e., a small antenna with high Q factor). Product readers provide better quality modulation. Therefore, any product card, which operates satisfactorily with the PayPass-Reference PCD under extreme load conditions, is likely to work in the field with deployed product readers.

It will be understood that the architecture and circuit parameters of the PayPass-Reference PCD and PayPass-Reference PICC devices are selected with consideration of their intended use for testing product devices. A particular architecture of the exemplary PayPass-Reference devices is described herein only for purposes of illustration. Alternate reference devices may have any convenient architecture and design consistent with the present invention as long as their externally observable behavior is similarly specified. It will be understood that choice of the architecture and design parameters for the reference devices is independent of the architecture and design parameters of product cards and product readers. The choice of a particular architecture for a reference device does not impose or require the product devices to have the same or any particular architecture (e.g., antenna layout and resonance frequencies).

Like the PayPass-Reference PCD, the PayPass-Reference PICC (FIG. 2b) is designed to be representative of product card characteristics observed in the field. The PayPass-Reference PICC has an antenna, which is similar to those found in ID-1 cards, and which like the PayPass-Reference PCD antenna may be wound as a coil on a printed circuit board assembly. FIG. 3b shows a circuit board diagram of the PayPass-Reference PICC. In addition to the antenna coil, the circuit board (referred to as the "PICC circuit") includes tuning circuits, a bridge rectifier, FET Shunt modulators, Zener diode, smoothing circuits, clock demodulators and other signal processing circuits.

Further, in addition to the PICC circuit, the PayPass-Reference PICC includes a calibration coil, which is mounted about 15 mm above the printed circuit board in a single unified assembly. The unified assembly is designed to analyze the signals as sent out by a PCD. The calibration coil allows analysis of the full frequency content of a PCD signal, which usually cannot be accomplished using the PICC circuit alone, given its limited bandwidth. The calibration coil may be designed based on criteria defined in ISO 10372-6 standards.

The PICC circuit is designed so that characterization tests of a PCD are always conducted under load conditions which simulate card use conditions in the field. The PayPass-Reference PICC is also designed to send information back to a PCD using different levels of load modulation. For this purpose, the PICC circuit includes a variable load, which is self-adapting to changing magnetic field strength. While sending data back to a PCD, the calibration coil can be used to induce noise and test the receiver quality of the PCD.

Table 2 lists a set of design parameter values selected for the exemplary PayPass-Reference PICC.

TABLE 2

| | |
|---|---|
| Coil size: | 72 mm × 42 mm with 5 mm radius at corners |
| Physical location: | mounted 15 mm below landing zone plate |
| Overall board dimensions: | 5200 mils × 1890 mils |
| Coil inductance in free air, with no mutual coupling: | ~3-4 micro Henry |
| Number of turns: | 4 |
| Shape: | two concentric circles, connected in series |
| Track width: | 0.5 mm |
| Turn spacing: | 0.5 mm |
| Resonant frequency: | 16.1 MHz ± 50 KHz |
| On board circuitry: | rectifier, variable load, modulation circuits |

Further, the values of the parameters of the variable load in the PayPass-Reference PICC are selected based on the maximum power consumption observed in PICCs currently deployed in the field. The maximum power consumption load represents a worst case scenario for a PCD. Currently deployed product PICCs are expected to consume less power than the PayPass-Reference PICC. Future versions of PICCs, which will benefit from evolving low-power semiconductor device technologies, are likely to consume even less power.

Figure 4:
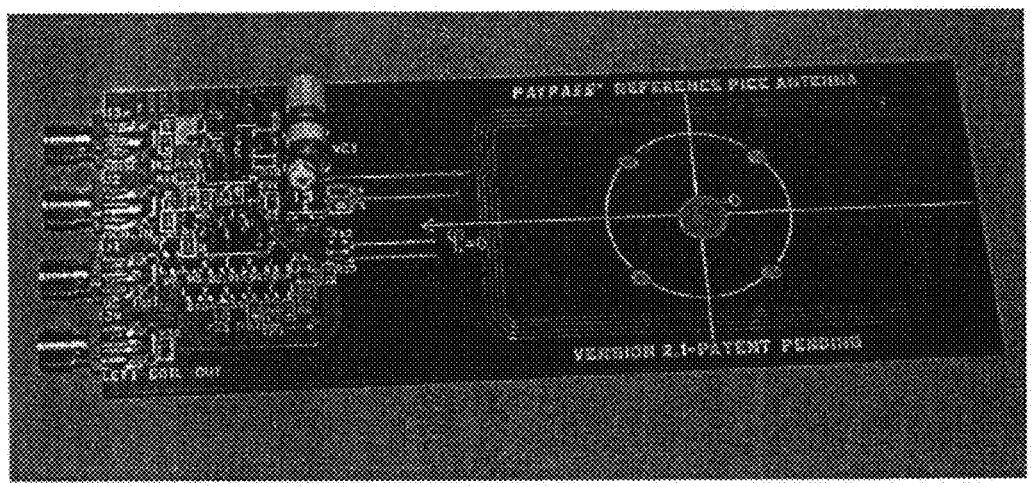

FIG. 4 shows an alternative exemplary Reference card (PICC). This alternative exemplary Reference PICC comprises a single PCB with two coils at one end. The other end to the coils has a circuit that tunes the antenna, rectifies the RF signal, provides a series of load circuits and provides for load modulation of the RF field. Connections are made to a series of SMA connectors at the end farthest away from the coils. Although, a Reference PICC is normally tuned to 16.1 MHz, it is also possible that it will be tuned to other frequencies for specific purposes.

Figure 5:
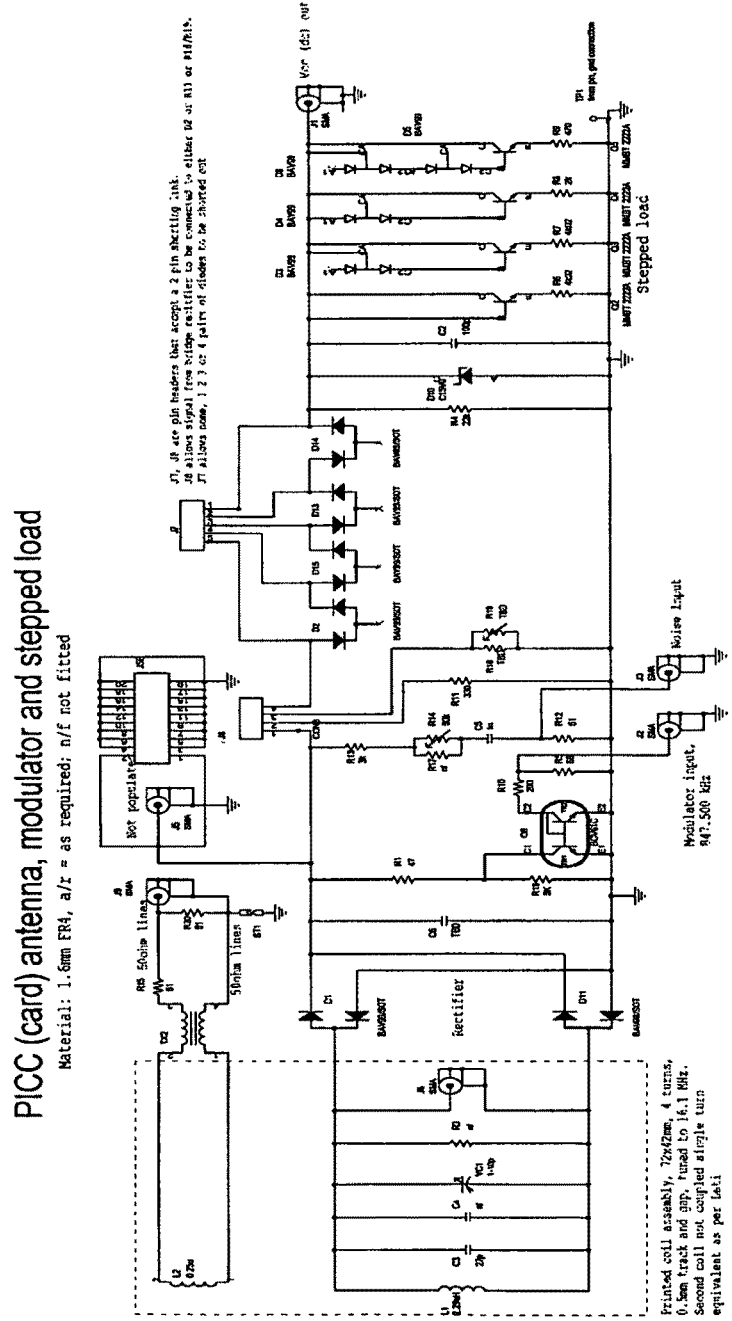
FIG. 5 is a circuit diagram of an alternative exemplary Reference card (PICC) designed in accordance with the principles of the present invention.

FIG. 5 shows a circuit diagram of an alternative exemplary Reference card (PICC). The Reference PICC circuit contains the following parts:
1. An antenna and tuned circuit
2. A bridge rectifier
3. A modulator for generating PICC→PCD communications
4. A noise injection circuit
5. Linear Loads
6. A non linear load
7. A pickup coil for sensing PCD communications The antenna comprises a 4 turn coil and tuning capacitors (C3,C4,VC1) that resonate the antenna to a specific frequency (13.56, 16.1 or 18 MHz). In order to allow for tuning, an SMA connector, J6, is included. This is in parallel with the tuned circuit and it is important to note that the outer of this SMA is not at local ground potential when the Reference PICC is in use.

The rectifier comprises a pair of dual diodes, D1 and D11 together with a small capacitor C6. This generates a "DC" voltage from the antenna. C6 does not eliminate ripple from this voltage—it still carries a significant RF component. The aim of C6 is to swamp any small variations in usage caused by minor capacitance changes. It cannot be large or load modulation would be affected.

The modulator comprises R1, R16, Q8, R10, R5 and J2. The input from a signal source is delivered to the SMA connector J2 which presents an approximate 50Ω load to the source. The signal may go negative but is intended to constitute a positive going signal relative to ground of amplitude of approximately 2.5V peak. The amplitude will vary in use as the amplitude of this signal controls the amplitude of the load modulation generated by the Reference PICC. R10 has been chosen to set the nominal operating point at about 2.5V and R5 chosen to create the nominal 50Ω load at J2. Q8 is a current mirror that presents a varying load on the Reference PICC in accordance with the control signal delivered to the mirror via J2 from an external controller.

The noise injection circuit comprises R13, R14, R17, C5, R12 and J3. This circuit, intended for future use if required, permits an AC signal to be superimposed on the signal from the modulator, thereby creating noise in the load modulation. This input is designed for "broadband" or "band limited" noise. It is also possible to generate other forms of "noise" by means of the modulator input J2, depending on the type of test being performed.

The load is selected by using the connector J8. In use, a jumper is either omitted (no load) or connected between pin 1 and one of the other 3 pins, pins 2, 3 or 4 of connector J8. When connected from pin 1 to pin 4, a non linear (stepped) load is selected. This presents a load very similar to that present in a previously described version of the Reference PICC. J8 also permits two other loads to be selected by use of pins 2 and 3. These are resistive (linear) loads. One is a fixed 330Ω load, the other may, subject to Reference PICC configuration, be fitted with a variable or a fixed resistor. Connector J5B permits the connection of an external circuit. This connector is designed for experimental use for other load circuits—for example a voltage regulator or a current sink.

The non linear (stepped) load comprises all components shown to the right of R4. J7 allows some variation in this load. A jumper is used to short out none, 1, 2, 3 or all 4 pairs of diodes. To implement a load the same as previously described Reference PICC, two pairs of diodes are shorted. This is the usual configuration of the non linear load. J1 is an SMA connector that permits the voltage across the load to be measured. This is used in checking the field generated by a PCD.

Finally, the pickup coil is formed of L2, TX2, R15, R20 and J9. It is modelled on the coil structure proposed by LETI/CEA—Laboratoire D'Electronique, de Technologie et D'Instrumentation, Commisariat a L'Energie Atomique. This design minimizes the coupling between the main antenna (L1) and the pickup coil (L2). The coupling is frequency dependant, and rises at higher frequencies. The significance of coupling between the coils is twofold. First, strong coupling compromises the measurement of PCD type B modulation and secondly, harmonics generated by the Reference PICC rectifier interfere with measurements. The use of TX2 and a 50Ω load on J9 reduces these effects to the point where they are insignificant. A small amount of high order harmonic distortion will be seen on the J9 connector and although it does not affect the accuracy of measurements, a 50Ω inline filter such as the Mini-Circuits BLP21.4 will remove any trace of harmonics. In use, R20 is not fitted and J9 connected at all times to the CMR, which presents a 50Ω load to the connection. This imposes a small but constant load on the field. A high impedance probe is not needed or used. Finally, in use, the ground of the pickup coil is not connected to the ground of the rest of the circuit. Solder pad ST1 is provisioned in case local ground connection is required.

The resonant frequency of the Reference PICC coil alters with the applied field strength. As the load increases, either because a low impedance load is used or because the non linear load applies a greater loading, the Q will decrease and the resonant frequency will also decrease. This mimics the behavior seen in many cards.

While the present invention has been particularly described with reference to exemplary embodiments thereof, it will be understood by those skilled in the art that various modifications and alterations may be made without departing from the spirit and scope of the invention. Accordingly, the disclosed embodiments of the invention are considered merely illustrative, and the invention is limited in scope only as specified in the appended claims.

We claim:

1. A reference card for testing card readers that are used to read a set of several different types of contactless payment cards that are deployed in an electronic payment system, the set of different types of payment cards exhibiting a corresponding set of diverse behaviors, the reference card comprising:
    a reference card electronic circuit comprising:
        a current mirror having electrically programmable parameters; and
        a control input node coupled to said current mirror, said input node capable of being connected to an external controller programmed to alter said electrically programmable parameters;
    wherein said reference card electronic circuit is configured to exhibit load conditions that simulate behavior of more than one types of contactless payment cards in the electronic payment system to the card reader under test.

2. The reference card of claim 1 wherein the reference card electronic circuit comprises an antenna having a resonant frequency tuned to any one of 13.56 MHz, 16.1 MHz, and 18 MHz.

3. The reference card of claim 2, wherein the variable load represents a maximum card power consumption in a worst case scenario to the card reader under test.

4. The reference card of claim 1, further comprising: a manually selectable load switching device; a set of load simulating elements coupled to said load switching device, said load simulating elements including at least one variable resistive load and one non-linear load; whereby one or more of said load simulating elements are activated by the manipulation of said manually selectable load switching device.

5. The reference card of claim 4, wherein said manually selectable load simulating device is a jumper connected to a plurality of diodes.

6. The reference card of claim 1, further comprising an external load input port capable of being connected to en external load.

7. The reference card of claim 1, wherein the reference card electronic circuit is configured to transmit information to the card reader under test using different-levels and shapes of load modulation.

8. The reference card of claim 1, wherein said reference card is configured to induce noise in the transmitted information.

9. The reference card of claim 1, wherein said current mirror presents a varying load based on a control signal delivered to said current mirror via said control input node.

10. The reference card of claim 1, wherein said current mirror presents an electronically adjustable variable load.

11. The reference card of claim 10, wherein said electronically adjustable variable load is based on a control signal provided by said external controller to said control input node.

12. A method for testing a card reader comprising:
    generating a signal by a reference card, the reference card comprising:
        a reference card electronic circuit comprising:
            a current mirror having electrically programmable parameters; and
            a control input node coupled to said current mirror, said input node capable of being connected to an external controller programmed to alter said electrically programmable parameters; and
    adjusting the signal by varying the load presented on the reference card using the current mirror.

13. The method of claim 12, wherein varying the load presented on the reference card comprises varying a control signal delivered to the current mirror via the control input node.

14. The method of claim 12, further comprising measuring the reader power parameters in response to the signal.

15. The method of claim 12, further comprising measuring the reader transmitter parameters in response to the signal.

* * * * *